United States Patent
Eggenhuisen et al.

(10) Patent No.: US 12,286,525 B2
(45) Date of Patent: Apr. 29, 2025

(54) INFRARED TRANSPARENT POLYCARBONATE COMPOSITION

(71) Applicant: SABIC GLOBAL TECHNOLOGIES B.V., Bergen op Zoom (NL)

(72) Inventors: Tamara Marijke Eggenhuisen, Raamsdonksveer (NL); Shigeru Haba, Tochigi (JP); Eduardus Ludovicus Louisa Broekaart, Nieuw-Namen (NL); Sijun Li, Shanghai (CN)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 23 days.

(21) Appl. No.: 17/639,131

(22) PCT Filed: Sep. 4, 2020

(86) PCT No.: PCT/EP2020/074743
§ 371 (c)(1),
(2) Date: Feb. 28, 2022

(87) PCT Pub. No.: WO2021/043968
PCT Pub. Date: Mar. 11, 2021

(65) Prior Publication Data
US 2022/0289943 A1 Sep. 15, 2022

(30) Foreign Application Priority Data
Sep. 4, 2019 (EP) .................................... 19195267

(51) Int. Cl.
*C08K 5/41* (2006.01)
*C08K 5/00* (2006.01)
*C08K 5/08* (2006.01)

(52) U.S. Cl.
CPC .............. *C08K 5/08* (2013.01); *C08K 5/0041* (2013.01); *C08K 5/41* (2013.01); *C08K 2201/014* (2013.01)

(58) Field of Classification Search
CPC .................... C08K 5/0041; C08K 5/08; C08K 2201/014; C08K 5/41
See application file for complete search history.

(56) References Cited

U.S. PATENT DOCUMENTS

| | | |
|---|---|---|
| 9,817,174 B2 | 11/2017 | Miyake et al. |
| 2011/0021678 A1 | 1/2011 | Isozaki et al. |

(Continued)

FOREIGN PATENT DOCUMENTS

| | | |
|---|---|---|
| KR | 20170036252 A | 4/2017 |
| WO | 2007149624 A1 | 12/2007 |

(Continued)

OTHER PUBLICATIONS

International Search Report and Written Opinion, International Application No. PCT/EP2020/074743; International Filing Date: Sep. 4, 2020; Date of Mailing: Oct. 13, 2020;131 pages.

*Primary Examiner* — Catherine S Branch
*Assistant Examiner* — Huihong Qiao
(74) *Attorney, Agent, or Firm* — CANTOR COLBURN LLP

(57) ABSTRACT

The present invention relates a polycarbonate composition comprising polycarbonate, acid stabiliser and at least one anthraquinone based colorant having at least one hydroxyl group, wherein the composition has a transmission of at least 80% in an infrared light wavelength range of from 760-1120 nm, wherein transmission is determined on an injection moulded plaque having a thickness of 2 mm prepared by injection moulding the composition at a maximum temperature of 320° C. and at a residence time of 10 minutes. Preferably the composition has a transmission of at most (Continued)

10% in the visible light wavelength range of from 380-740 nm.

11 Claims, 1 Drawing Sheet

(56) References Cited

U.S. PATENT DOCUMENTS

2013/0116365 A1    5/2013   Yokogi et al.
2014/0128526 A1    5/2014   Uno et al.
2015/0368434 A1   12/2015   Meyer et al.

FOREIGN PATENT DOCUMENTS

| WO | WO2017/216769 | * 12/2017 | ............... C08K 5/42 |
| WO | 2018229730 A1 | 12/2018 | |
| WO | 2019102349 A2 | 5/2019 | |

* cited by examiner

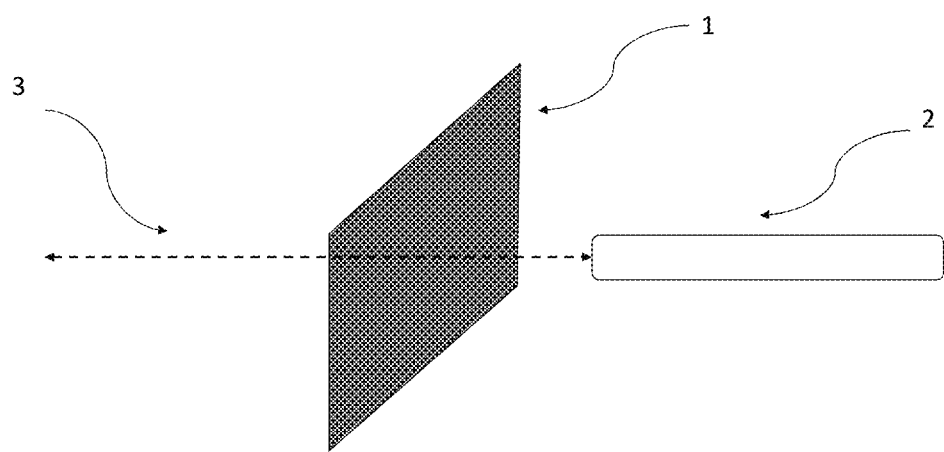

INFRARED TRANSPARENT POLYCARBONATE COMPOSITION

CROSS REFERENCE TO RELATED APPLICATIONS

This application is a National Stage application of PCT/EP2020/074743 filed Sep. 4, 2020, which claims the benefit of European Application No. 19195267.0, filed Sep. 4, 2019, both of which are incorporated by reference in their entirety herein.

The present invention relates to a polycarbonate composition for use specifically in panels having a relatively low transmission in the visible light wavelength range and a high transmission in an infrared wavelength range. The present invention further relates to a panel and the use thereof, said panel comprising or consisting of said polycarbonate composition.

Polycarbonate panels having a relatively low transmission in the visible light wavelength range and a high transmission in an infrared wavelength range are advantageously used in applications which require the use of sensors that operate based on infrared radiation and wherein the sensors itself cannot be observed by the human eye. For example, the sensor are positioned on a side of a panel which faces an internal structure, whereas the other side of the panel can be observed in normal use. By way of example, such panels can be used as (part of) a front panel of a vehicle where the sensors and accompanying electronics are positioned such that they cannot be observed in normal use, thereby allowing the manufacture of vehicles having desired aesthetics in combination with state of the art safety provisions provided by the sensors.

Polycarbonate compositions having a low transmission in the visible light are known per se and can be made, for example, by compounding polycarbonate with carbon black. Such compositions can be made at low cost and provide sufficient low visible light transmission. However, carbon black also absorbs infrared light so that the use of such compositions is less suitable for the application described above.

Polycarbonate compositions having a low transmission in the visible light can also be made by using a combination of colorants that do not, or to a far lesser extent, absorb infrared light. Some of these however contain hydroxyl groups which the inventors have found to react with polycarbonate at high moulding temperatures, thereby causing an undesirable change in the light absorption properties of the colorant and hence the polycarbonate composition.

WO2019/102349 discloses a panel for use on a vehicle including a first portion with a relatively high transmission in the visible light and optionally a second portion with a relatively low visible light transmission and being at least partially transparent to infrared light such that infrared sensors can be hidden from view, but yet transmit infrared light through the second portion.

US2015/368434 discloses coloured moulding compounds on the basis of polycarbonate, particularly this reference discloses polycarbonate compositions containing special organic colorants with high colour stability against weathering as a result of using special stabilisers on the basis of phosphate. US2015/368434 further discloses a polymer composition containing at least one thermoplastic substance, at least one organic colorant, preferably a combination of at least two organic colorants of special structure, and at least one stabiliser on the basis of phosphate.

US2014/128526 discloses a method for manufacturing a polycarbonate composition comprising: reacting an aromatic dihydroxy compound and a diaryl carbonate in the presence of a catalyst to form a polycarbonate; and adding to the polycarbonate a polydiorgano siloxane having a kinematic viscosity of less than or equal to 20 mm$^2$/sec at 25° C., as determined in accordance with ASTM D445, and optionally an additive, to form the polycarbonate composition; wherein the polydiorgano siloxane has a phenyl content; and wherein a 3 mm plaque of the polycarbonate composition has a haze of less than or equal to 1% as determined in accordance with ASTMD1003-07, Procedure A, illuminant CIE-D65.

US2013/116365 discloses a polycarbonate resin composition which contains 100 parts by weight of a polycarbonate resin (A) at least containing structural units derived from a dihydroxy compound having the portion represented by the following formula (1) as part of the structure thereof and $0.1 \times 10^{-4}$ to $10.0 \times 10^{-4}$ parts by weight of a bluing agent, characterized in that a molded object (thickness, 3 mm) formed from the polycarbonate resin composition has a yellowness index (YI) value, as determined through an examination of transmitted light in accordance with ASTM D 1925-70, of 12 or less after having undergone a 100-hour irradiation treatment with a metal halide lamp at an irradiance for the wavelength range 300-400 nm of 1.5 kW/m$^2$ in an environment having a temperature of 63° C., and a relative humidity of 50%.

—(CH$_2$—O)—                        [Chem. 1]

[The case where the portion represented by the general formula (1) constitutes —CH$_2$—O—H is excluded.]

KR20170036252 discloses a polycarbonate thermoplastic resin composition, and more particularly to a thermoplastic resin composition having excellent infrared transmittance and visible light shielding ratio. More in particular this document discloses a polycarbonate resin composition comprising 90 to 99.89% by weight of a polycarbonate resin; from 0.1 to 5% by weight of an aromatic sulfonic sulfonic acid metal salt; (UL-94 test) is V-0, visible light (wavelength in the range of 300 nm or more and less than 700 nm) has a transmittance of 5% or less, and the light—A thermoplastic resin composition having an infrared ray transmittance of 85% or more in a wavelength region of 700 nm or more.

The present inventors found that the infrared absorbance of certain colorants is influenced by the conditions under which polycarbonate compositions containing such colorants is processed. In particular it was found that certain conditions result in an unfavourable shift of the absorbance spectrum of such colorants thereby lowering the transmission in the infrared wavelength range.

It is therefore an object of the present invention to provide a polycarbonate composition suitable for the manufacture of panels having a high transmission in an infrared wavelength range.

It is a further object of the present invention to provide a polycarbonate composition suitable for the manufacture of panels having in combination a low transmission in a visible light wavelength range and a high transmission in an infrared wavelength range.

More in particular it is an object of the invention to provide such a polycarbonate composition which can be processed into moulded articles, such as for example panels at extreme conditions, like high temperature and/or high residence time in the moulding equipment, wherein the effect of the processing on the optical properties in the visible and infrared wavelength range is reduced to a minimum.

The present inventors have surprisingly found that the change in transmission properties upon moulding of a polycarbonate composition containing anthraquinone based colorants having one or more hydroxyl groups can be reduced to a minimum when the polycarbonate composition further comprises an acid stabiliser.

Accordingly the present invention relates to a polycarbonate composition comprising polycarbonate, acid stabiliser and at least one anthraquinone based colorant having at least one hydroxyl group, wherein the composition has a transmission of at least 80% in an infrared light wavelength range of from 760-1120 nm, wherein transmission is determined on an injection moulded plaque having a thickness of 2 mm prepared by injection moulding the composition at a maximum temperature of 320° C. and at a residence time of 10 minutes.

More specifically the present invention relates to a polycarbonate composition comprising interfacial polycarbonate, acid stabiliser and at least one anthraquinone based colorant having at least one hydroxyl group, wherein the composition has a transmission of at least 80% in an infrared light wavelength range of from 760-1120 nm, wherein transmission is determined on an injection moulded plaque having a thickness of 2 mm prepared by injection moulding the composition at a maximum temperature of 320° C. and at a residence time of 10 minutes, and wherein the acid stabiliser is a sulfonic acid or a sulfonic acid ester, an organophosphorous acid or ester thereof, or a combination comprising at least one of the foregoing.

Upon application of the invention the aforementioned objects are met, at least in part.

The Figure is a schematic diagram of a detection system, wherein 1 is an injection-moulded panel made from the polycarbonate composition disclosed herein and wherein 2 is a sensor that operates at a wavelength in the infrared region. Sensor 2 transmits and/or receives infrared radiation 3 that travels through panel 1.

Polycarbonate

As used herein the term polycarbonate composition is to be understood as a composition containing as the polymer polycarbonate as the major component. The invention is disclosed herein on the basis of polycarbonate being the only polymer material in the composition. However, other polymers may be present in minor amounts. Accordingly and for the avoidance of doubt the amount of polycarbonate in the composition is at least 60 wt. %, preferably at least 80 wt. %, more preferably at least 90 wt. %, more preferably at least 95 wt. %, even more preferably at least 99 wt. % on the basis of the total amount of polymer materials in the composition. It is preferred that the polycarbonate composition essentially consists of polycarbonate as the polymer material and no other polymer materials are present in the composition. Accordingly it is preferred that the polymer material in the composition consists of polycarbonate, in particular of interfacial polycarbonate. In embodiments where a further polymer is present in the composition the further polymer shall be considered as being part of the polycarbonate.

Further polymers, which may be present as a minor component, may be polybutylene terephthalate, polyethylene terephthalate and/or acrylonitrile butadiene styrene (ABS) copolymers.

The polycarbonate in the polycarbonate composition can be a mixture of at least two polycarbonates which each may be a homopolymer or a copolymer. A specific example of a mixture consists of bisphenol A polycarbonate homopolymer and a polycarbonate-polysiloxane copolymer. It is preferred that the polycarbonate is a polycarbonate homopolymer obtained by reacting a bisphenol, such as bisphenol A, with a carbonate source such as phosgene or a diarylcarbonate such as diphenyl carbonate. Accordingly the polycarbonate of the polycarbonate composition according to the invention may be prepared using the so called interfacial process, wherein BPA reacts with phosgene, or may be prepared by means of the so-called melt or direct transesterification process, wherein BPA reacts with diphenyl carbonate. These two types of polycarbonate are known to the skilled person and may be further referred to herein as interfacial polycarbonate and melt polycarbonate. The skilled person knows that these two types of polycarbonate differ in amount of Fries branching, which only exists in melt polycarbonate and further in the terminal hydroxyl content, which is typically much lower for interfacial polycarbonate.

It is preferred that the polycarbonate is obtained via the interfacial process for the reason that said process, compared to the melt process, typically provides polycarbonate with a low number of hydroxyl chain ends. A low amount of hydroxyl chain ends is advantageous for heat stability and color retention of the polycarbonate. Nonetheless, polycarbonate obtained via the melt process, i.e. melt polycarbonate, is not excluded from being used in the present invention. In an embodiment the polycarbonate is a mixture of at least one polycarbonate obtained via the interfacial process and at least one polycarbonate obtained with the melt process. In such an embodiment the amount of melt polycarbonate may be from 30-70 wt. % and the amount of interfacial polycarbonate from 70-30 wt. %, based on the combined weight of the melt polycarbonate and the interfacial polycarbonate.

It is preferred that the polycarbonate comprises or consists of interfacial polycarbonate. It is further preferred that the polycarbonate is an interfacial polycarbonate prepared by reacting bisphenol A and phosgene. Accordingly it is preferred that the polycarbonate is a bisphenol A polycarbonate or a bisphenol A polycarbonate homopolymer.

The polycarbonate, or mixture of polycarbonates, preferably has a melt volume rate (MVR) of from 3 to 35 cm$^3$/10 min as determined in accordance with ISO 1133 (300° C., 1.2 kg). Preferably the MVR is from 6 to 25, more preferably from 14-21 cm$^3$/10 min.

The polycarbonate composition preferably has a melt volume rate of from 3 to 35 cm$^3$/10 min as determined in accordance with ISO 1133 (300° C., 1.2 kg). Preferably the MVR is from 6 to 25, more preferably from 14-21 cm$^3$/10 min.

Acid Stabiliser

The acid stabiliser is preferably a sulfonic acid or a sulfonic acid ester, an organophosphorous acid or ester thereof, or a combination comprising at least one of the foregoing, i.e. a combination comprising two or more of the foregoing. A preferred stabiliser is n-butyl tosylate (BuTos).

The sulfonic acid ester can comprise an organosulfonic acid stabilizer of the formula:

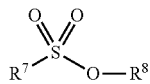

wherein each $R^7$ is independently a $C_{1-30}$ alkyl, $C_{6-30}$ aryl, $C_{7-30}$ alkylarylene, $C_{7-30}$ arylalkylene, or a polymer unit derived from a $C_{2-32}$ ethylenically unsaturated aromatic sulfonic acid or its ester, and $R^8$ is hydrogen $C_{1-24}$ alkyl, or a group of the formula —S(=O)$_2$—$R^7$ wherein $R^7$ is a $C^{6-12}$ aryl or $C^{7-24}$ alkylarylene. The sulfonic acid can comprise an alkylbenzene sulfonic acid, a polystyrene sulfonic acid, or a p-toluene sulfonic acid anhydride. Preferably the acid stabiliser is p-toluene sulfonic acid or butyl p-toluenesulfonate (i.e., n-butyl tosylate). The acid stabiliser is preferably applied in the polymer composition in an amount of from 0.5 ppm to 5 ppm, based on the total weight of the polymer composition.

The organophosphorous acid or ester thereof can include phosphorous acid, phosphoric acid, phosphite, phosphine, phosphonite compound, or a combination comprising at least one of the foregoing. Without willing to be bound to it the present inventors believe that the sulfonic acid or ester thereof, the organophosphorous acid or ester thereof, or a combination comprising at least one of the foregoing contributes to stabilizing an anthraquinone based colorant having at least one hydroxyl group. The present inventors assume that a reaction between the colorant and the polycarbonate is what results in a shift of the absorption spectrum of the colorant and accordingly the transmission properties of the polycarbonate composition.

For the avoidance of doubt it is noted that in the context of the present invention the term acid stabiliser means an acid or an ester of such acid. Other acid derived compounds such as for example salts are not considered as an acid stabiliser and are accordingly excluded from the term "acid stabiliser". More in particular the acid stabiliser is not an alkali or earth alkali metal salt such as an alkali or earth alkali metal salt of a sulfonic or organophosphorous acid.

Colorant

The composition disclosed herein contains at least one anthraquinone based colorant having at least one hydroxyl group. The term "anthraquinone based" means that the molecule constituting the colorant contains one or more anthraquinone moiety. Such colorants, due to the hydroxyl group may react with the polycarbonate, in particular under more extreme, sometimes referred to as "abusive" conditions of processing. Such conditions involve relatively high temperatures and relatively high residence times. A negative effect of such a reaction may be that the absorption spectrum of the colorant changes, which in turn changes the overall absorption spectrum and hence the transmission of the composition. As a result, the absorption of light in the infrared wavelength range may increase thereby possibly causing a malfunction or at least less reliable operation of infrared sensors that need to transmit and/or receive infrared light through a panel manufactured from the composition.

Preferably the anthraquinone based colorant is a green colorant, more preferably Solvent Green 28, having CAS registries 28198-05-2, 71839-01-5 or 4851-50-7.

In order to obtain the desired low visible light transmission, a combination of colorants is used wherein at least one such colorant, preferably the green colorant, is the anthraquinone based colorant having at least one hydroxyl group. Accordingly it is preferred that in the polycarbonate composition the anthraquinone based colorant is a green colorant and the composition further comprises one or more of a red colorant, a blue colorant, a yellow colorant and an orange colorant, preferably a red colorant and a blue colorant. The combination of red, blue and green colorants allows the manufacture of a composition, including moulded products therefrom, that have a black appearance and have a low visible light transmission. Yellow or orange colorants may be added to fine tune the final color tone of the product. For the avoidance of doubt it is noted that the composition of the invention may contain colorants that do not anthraquinone moieties.

The colorants are preferably organic dyes. The red dye is preferable selected one or more selected from group consisting of Solvent Red 52, Solvent Red 111, Solvent Red 135, Solvent Red 169, Solvent Red 179, Solvent Red 207, Disperse Red 22, Vat Red 41.

The blue dye is preferably one or more selected from group consisting of Disperse Blue 73, Solvent Blue 97, Solvent Blue 101, Solvent Blue 104, Solvent Blue 122, Solvent Blue 138. Optionally Solvent violet 13 may also be comprised in the composition disclosed herein, which for the purpose of the present disclosure shall be considered as a blue colorant.

The yellow dye is preferably one or more selected from group consisting of Disperse Yellow 201, Solvent Yellow 33, Solvent Yellow 114, Solvent Yellow 93, Solvent Yellow 98, Solvent Yellow 163, Solvent Yellow 160:1, Solvent Yellow 188.

The orange dye is preferably one or more selected from group consisting of Solvent Orange 60, Solvent Orange 63, Disperse Orange 47.

The total amount of colorant is generally selected so as to obtain the desired color intensity. In the polymer composition the total amount of colorant may be from 0.1-1000 ppm by weight.

The composition preferably does not comprise inorganic pigments for the reason that these may absorb too much infrared radiation. Organic pigments may be used in the composition disclosed herein provided they do not significantly absorb light in the infrared wavelength range in the wavelength range of from 760-1120 nm.

Composition

It is preferred that the composition is semi-transparent or non-transparent as determined on an injection moulded plaque having a thickness of 2 mm prepared by injection moulding the composition at a maximum temperature of 320° C. and at a residence time of 10 minutes. Accordingly it is preferred that the composition has a transmission in the visible light wavelength range from 380-740 nm of at most 50%.

For non-transparent compositions the composition has a transmission in the visible light wavelength range from 380-740 nm of at most 10%.

The composition may have a transmission in the visible light wavelength range from 380-740 nm of from 11 to 50%, such as from 20-40%.

The composition may have a transmission in the visible light wavelength range from 380-740 nm of from 0 to 10% such as from 2-8%.

The transmission in the visible light can be adjusted by means of the concentration and type of colorants that are used as is known in general. In order to meet the transmission requirement throughout the wavelength range of from 380-740 nm often a combination of green, red and blue colorants is used, optionally with some further colorants to modify the final color tone. Typically an overall black color tone is desired.

In an embodiment wherein the optical hiding power of a panel manufactured from the composition disclosed herein is of less relevance or importance, the composition may have a transmission in the visible light wavelength range from 380-740 nm of from 51 to 90%, such as from 60-80%.

The composition preferably has a melt volume rate of from 3 to 35 cm³/10 min as determined in accordance with ISO 1133 (300° C., 1.2 kg). Preferably the MVR is from 6 to 25, more preferably from 14-21 cm³/10 min.

It is preferred that the polycarbonate composition disclosed herein comprises red colorant, blue colorant and green colorant, wherein at least the green colorant is an anthraquinone based colorant having at least one hydroxyl group, wherein
the amount of red colorant is at most 0.5 wt. %, preferably from 0.05 to 0.5 wt. %
the amount of blue colorant is at most 0.5 wt. %, preferably from 0.05 to 0.5 wt. %
the amount of green colorant is at most 0.5 wt. %, preferably from 0.05 to 0.5 wt. %
the amount of acid stabiliser is at most 3 ppm by weight, preferably from 0.1 to 3 ppm based on the weight of the composition.

The polycarbonate composition disclosed herein may comprise a green anthraquinone based colorant having at least one hydroxyl group colorant and optionally a red and/or a blue colorant, wherein
the amount of red colorant, if any, is at most 0.5 wt. %, preferably from 0.01 to 0.5 wt. %
the amount of blue colorant, if any, is at most 0.5 wt. %, preferably from 0.01 to 0.5 wt. %
the amount of green colorant is at most 0.5 wt. %, preferably from 0.01 to 0.5 wt. %
the amount of acid stabiliser is at most 3 ppm by weight, preferably from 0.1 to 3 ppm
based on the weight of the composition. Such compositions may be useful in for compositions that do not require a low transmission in the visible wavelength region, or wherein only a specific wavelength region is required to have a certain transmission.

The composition as disclosed herein may further comprise additives common in the art such as release agents, anti-oxidants, UV stabilisers, flame retardants and fillers, provided that the amounts thereof do not cause a significant deterioration of infrared radiation in the wavelength range of from 760-1120 nm. It is preferred that the composition of the invention does not contain a flame retardant. More in particular it is preferred that the composition does not comprise an aromatic sulfonic sulfonic acid metal salt. Even more in particular it is preferred that the composition does not comprise sodium diphenylsulfone-3-sulfonate, potassium diphenylsulfone-3-sulfonate, sodium 4,4'-dibromodiphenylsulfone-Sodium 4'-dibromodiphenylsulfone-3-sulfonate, calcium 4-chloro-4'-nitrophenylsulfone-3-sulfonate, disodium diphenylsulfone-Sodium sulfone-3,3'-disulfonate, or combinations of two or more of the foregoing.

The present invention further relates to a method for the manufacture of the composition as disclosed herein, the method comprising combining polycarbonate, acid stabiliser and an anthraquinone based colorant having at least one hydroxyl group and optionally one or more of the of a red colorant, blue colorant, yellow colorant and orange colorant in a melt mixing device followed by melt mixing the composition to a substantially homogeneous composition.

The present invention further relates to a moulded article, preferably an injection moulded article, comprising or consisting of the polycarbonate composition of the present invention. The moulded article preferably has a portion with a thickness of from 0.1-10 mm, preferably from 2-7 mm, more preferably from 4-6 mm. Such portion is the portion that is preferably used for sending and/or receiving of infra-red radiation such as those transmitted and/or received by sensors in the automotive industry.

The present invention further relates to an extruded sheet comprising the composition disclosed herein as well as any thermo-formed article manufactured from such a sheet.

The present also relates to a detection system comprising the injection moulded article disclosed herein and a sensor, wherein said sensor detects infrared radiation that, travels through said injection moulded article. Put differently, the present also relates to a detection system comprising the injection moulded article disclosed herein and a sensor capable of detecting infrared radiation travelling through said injection moulded article. In use, such detection system is preferably configured such that the sensors cannot be observed during normal use of the panel. For example when incorporated into a vehicle the sensors cannot be observed from the outside of the said vehicle. This can be achieved when the composition has a transmission (for 2 mm injection moulded plaques) in the visible wavelength range of from 380-740 nm of at most 50%, preferably at most 10%. An example of sensors used in vehicles that may use infrared radiation are proximity and/or car detection sensors. A schematic example of such detection system is shown in the Figure, wherein panel 1 is a panel (injection) moulded from composition disclosed herein. Sensor 2 is a sensor that operates at a wavelength in the infrared wavelength region. Sensor 2 transmits and/or receives infrared radiation 3 that travels through panel 1. Because panel 1 has a relatively low transmission for visible light the sensor cannot be observed from a side opposite to the side where the sensor 2 is positioned.

The present invention further relates to an electrical vehicle, preferably an electrical car comprising the injection moulded article or the detection system disclosed herein.

The present invention relates to the use of an acid stabiliser, preferably sulfonic acid or a sulfonic acid ester, in a polycarbonate composition comprising an anthraquinone colorant having at least one hydroxyl group, for the manufacture of a moulded article at a temperature of at least 300° for maintaining a transmission of at least 80% in an infrared wavelength range of from 760 to 1120 nm.

The present invention further relates to the use of an acid stabiliser, preferably sulfonic acid or a sulfonic acid ester, in a polycarbonate composition comprising an anthraquinone colorant having at least one hydroxyl group, for stabilising said colorant.

The present invention will now further elucidated on the basis of the following non-limiting examples.

TABLE 1

| | |
|---|---|
| PC1 | Linear bisphenol A polycarbonate, prepared with an interfacial process, having a weight average molecular weight (Mw) of 30,000 g/mol as determined with GPC using polycarbonate standards and a MVR of 6 cm3/10 min in accordance with ISO 1133 (300° C., 1.2 kg). |
| PC2 | Linear bisphenol A polycarbonate, prepared with an interfacial process, having a weight average molecular weight (Mw) of 21,800 g/mol as determined with GPC using polycarbonate standards and a MVR of 25 cm3/10 min in accordance with ISO 1133 (300° C., 1.2 kg). |
| SRd135 | Solvent Red 135, CAS# 20749-68-2 commercially available from Lanxess |
| SRd52 | Solvent Red 52, CAS# 81-39-0 commercially available from Lanxess |
| SGr28 | Solvent Green 28, CAS# 4851-50-7, commercially available from Lanxess |
| SGr3 | Macrolex Green 5B, CAS# 128-80-3commercially available from Lanxess |
| PB15:4 | Pigment Blue 15:4, CAS# 147-14-8 Commercially available from BASF |
| UV | |

TABLE 1-continued

| | |
|---|---|
| Release | Palmitic/Stearic Acid ester of Dipenta/Pentaerythritol (CAS# 115-83-3) |
| AO | Octadecyl 3(3,5 di-tertbutyl-4-hydroxyphenyl)propionate (CAS# 2082-79-3) |
| Stab1 | Tris-(2,4-di-tert-butylphenyl) phosphite (CAS# 31570-04-4) |
| Stab2 | Butyl p-toluenesulfonate (CAS# 778-28-9) |

Sample materials were dried at 120° C. for 2.5 hours before injection moulding. All compositions except where indicated are compounded on a Werner & Pfleiderer co-rotating twin screw extruder (Length/Diameter (L/D) ratio=30/1, vacuum port located near die face). The twin-screw extruder had enough distributive and dispersive mixing elements to produce good mixing between the polymer compositions. The compositions are subsequently moulded according to ISO 294 on an Engel-75 injection moulding machine. The dimensions of the moulded test samples was 60×60×2 mm.

The following temperature profiles were used for the extruder of the injection moulding machine:

| Profile | Zone 1 [° C.] | Zone 2 [° C.] | Zone 3 [° C.] | Nozzle [° C.] |
|---|---|---|---|---|
| 280 | 260 | 270 | 280 | 275 |
| 300 | 280 | 290 | 300 | 295 |
| 320 | 300 | 310 | 320 | 315 |
| 340 | 320 | 330 | 340 | 335 |

The residence time of the material in the screw was controlled by the cooling of the injection moulded plaques. In the tables below the temperature "Temp" refers to the temperature of Zone 3 of the extruder.

Optical properties were determined using a Perkin Elmer labsphere 950 UV-vis-NIR spectrophotometer measuring in transmission mode with integrating sphere on injection moulded plaques with a thickness of 2 mm, and width and length of 50 mm respectively. Measurements were carried out at room temperature, i.e. 25° C. Transmission is the ratio of the intensity of light received at the sensor and the intensity of light transmitted through the sample. Commonly this is expressed as a percentage, i.e. T %=100×($I_{detector}/I_0$) with $I_{detector}$ being the intensity of light detected by a detector and $I_0$ the intensity of light that is being sent into the sample. This is known to a skilled person per se. Thus, transmission was determined using a spectrophotometer in transmission mode with integrating sphere. The reported transmission is expressed herein as a percentage

TABLE 2

| | | CE0 | CE1 | CE2 | CE3 | CE4 | CE5 | CE6 | CE7 |
|---|---|---|---|---|---|---|---|---|---|
| PC1 | [wt. %] | 20 | 20 | 20 | 20 | 20 | 20 | 20 | 20. |
| PC2 | [wt. %] | 79.31 | 79.31 | 79.31 | 79.31 | 79.31 | 79.31 | 79.31 | 79.31 |
| UV | [wt. %] | 0.2 | 0.2 | 0.2 | 0.2 | 0.2 | 0.2 | 0.2 | 0.2 |
| Release | [wt. %] | 0.3 | 0.3 | 0.3 | 0.3 | 0.3 | 0.3 | 0.3 | 0.3 |
| Stab1 | [wt. %] | 0.05 | 0.05 | 0.05 | 0.05 | 0.05 | 0.05 | 0.05 | 0.05 |
| AO | [wt. %] | 0.02 | 0.02 | 0.02 | 0.02 | 0.02 | 0.02 | 0.02 | 0.02 |
| Stab2 | [wt. %] | — | — | — | — | — | — | — | — |
| SRd135 | [wt. %] | 0.03 | 0.03 | 0.03 | 0.03 | 0.03 | 0.03 | 0.03 | 0.03 |
| SRd52 | [wt. %] | 0.023 | 0.023 | 0.023 | 0.023 | 0.023 | 0.023 | 0.023 | 0.023 |
| SGr28 | [wt. %] | 0.067 | 0.067 | 0.067 | 0.067 | 0.067 | 0.067 | 0.067 | 0.067 |
| Temp | [° C.] | 280 | 300 | 300 | 300 | 320 | 320 | 320 | 340 |
| Time | [min] | 5 | 10 | 30 | 60 | 10 | 30 | 60 | 10 |
| T_720 | [%] | 0.1 | 0.04 | 0.3 | 1.1 | 0.2 | 2.0 | 4.3 | 3.1 |
| T_740 | [%] | 3.0 | 1.8 | 2.9 | 4.0 | 2.6 | 5.35 | 6.1 | 6.5 |
| T_820 | [%] | 87.5 | 82.9 | 59.2 | 39.4 | 58.8 | 39.3 | 27.6 | 33.9 |
| T_820-920 | [%] | 89.1 | 87.5 | 73.7 | 57.9 | 73.0 | 57.5 | 49.7 | 51.9 |

Time refers to the residence time of the composition in the extruder of the injection moulding equipment.

T_720, T_740 and T_820 refer to the transmission at a wavelengths of 720 nm, 740 nm and 820 nm respectively.

T_820-920 refers to a numerical average for the transmission of the tested sample in the wavelength range from 820 to 920 nm.

From Table 2 it can be observed that under more abusive moulding conditions, i.e. increasing temperature and/or residence time, the transmission of the test sample in the infrared wavelength range drops significantly.

TABLE 3

| | | CE8 | CE9 | CE10 | CE11 |
|---|---|---|---|---|---|
| PC1 | [wt. %] | 20 | 20 | 20 | 20 |
| PC2 | [wt. %] | 79.23 | 79.21 | 79.23 | 79.08 |
| UV | [wt. %] | 0.15 | 0.15 | 0.15 | 0.15 |
| Release | [wt. %] | 0.3 | 0.3 | 0.3 | 0.3 |
| Stab1 | [wt. %] | 0.05 | 0.05 | 0.05 | 0.05 |
| AO | [wt. %] | 0.02 | 0.02 | 0.02 | 0.02 |
| Stab2 | [wt. %] | — | — | — | — |
| SRd135 | [wt. %] | 0.12 | 0.12 | | |
| PB15:4 | [wt. %] | 0.01 | 0.03 | | |
| G5B | [wt. %] | 0.12 | 0.12 | 0.25 | 0.4 |
| Temp | [° C.] | 280 | 280 | 280 | 280 |
| Time | [min] | 5 | 5 | 5 | 5 |
| T_720 | [%] | 0.2 | 0.2 | 2.1 | 1 |
| T_740 | [%] | 0.4 | 0.1 | 47.8 | 30.6 |
| T_820 | [%] | 81 | 72.9 | 89.7 | 88.6 |
| T_820-920 | [%] | 88 | 86.6 | 89.4 | 88.9 |

TABLE 4

|  |  | CE12 | CE13 | CE14 | CE15 | CE16 | CE17 | CE18 | CE19 |
|---|---|---|---|---|---|---|---|---|---|
| PC1 | [wt. %] | 20 | 20 | 20 | 20 | 20 | 20 | 20 | 20 |
| PC2 | [wt. %] | 76.48 | 76.48 | 76.48 | 76.48 | 76.48 | 76.48 | 76.48 | 76.48 |
| UV | [wt. %] | 0.15 | 0.15 | 0.15 | 0.15 | 0.15 | 0.15 | 0.15 | 0.15 |
| Release | [wt. %] | 0.3 | 0.3 | 0.3 | 0.3 | 0.3 | 0.3 | 0.3 | 0.3 |
| Stab1 | [wt. %] | 0.05 | 0.05 | 0.05 | 0.05 | 0.05 | 0.05 | 0.05 | 0.05 |
| AO | [wt. %] | 0.02 | 0.02 | 0.02 | 0.02 | 0.02 | 0.02 | 0.02 | 0.02 |
| Stab2 | [wt. %] | — | — | — | — | — | — | — | — |
| SGr3 | [wt. %] | 3.0 | 3.0 | 3.0 | 3.0 | 3.0 | 3.0 | 3.0 | 3.0 |
| Temp | [° C.] | 280 | 300 | 300 | 300 | 320 | 320 | 320 | 340 |
| Time | [min] | 5 | 10 | 30 | 60 | 10 | 30 | 60 | 10 |
| T_720 | [%] | 0.0 | 0.0 | 0.0 | 0.0 | 0.0 | 0.0 | 0.0 | 0.0 |
| T_740 | [%] | 0.1 | 0.1 | 0.1 | 0.0 | 0.1 | 0.0 | 0.0 | 0.0 |
| T_820 | [%] | 67.2 | 72.2 | 54.4 | 30.0 | 42.4 | 18.3 | 10.3 | 15.9 |
| T_820-920 | [%] | 73.5 | 77.6 | 68.2 | 53.8 | 62.2 | 42.6 | 27.1 | 41.9 |

TABLE 5

|  |  | E1 | E2 | E3 | E4 | E5 | CE20 | CE21 | CE22 |
|---|---|---|---|---|---|---|---|---|---|
| PC1 | [wt. %] | 20 | 20 | 20 | 20 | 20 | 20 | 20 | 20 |
| PC2 | [wt. %] | 79.3 | 79.3 | 79.3 | 79.3 | 79.3 | 79.3 | 79.3 | 79.3 |
| UV | [wt. %] | 0.2 | 0.2 | 0.2 | 0.2 | 0.2 | 0.2 | 0.2 | 0.2 |
| Release | [wt. %] | 0.3 | 0.3 | 0.3 | 0.3 | 0.3 | 0.3 | 0.3 | 0.3 |
| Stab1 | [wt. %] | 0.05 | 0.05 | 0.05 | 0.05 | 0.05 | 0.05 | 0.05 | 0.05 |
| AO | [wt. %] | 0.02 | 0.02 | 0.02 | 0.02 | 0.02 | 0.02 | 0.02 | 0.02 |
| Stab2 | [ppm] | 2 | 2 | 2 | 2 | 2 | 2 | 2 | 2 |
| SRd135 | [wt. %] | 0.03 | 0.03 | 0.030 | 0.03 | 0.03 | 0.03 | 0.03 | 0.03 |
| SRd52 | [wt. %] | 0.023 | 0.023 | 0.023 | 0.023 | 0.023 | 0.023 | 0.023 | 0.023 |
| SGr28 | [wt. %] | 0.067 | 0.067 | 0.067 | 0.067 | 0.067 | 0.067 | 0.067 | 0.067 |
| Temp | [° C.] | 280 | 300 | 300 | 300 | 320 | 320 | 320 | 340 |
| Time | [min] | 5 | 10 | 30 | 60 | 10 | 30 | 60 | 10 |
| T_720 | [%] | 0.0 | 0.0 | 0.0 | 0.0 | 0.0 | 0.0 | 0.0 | 0.0 |
| T_740 | [%] | 0.1 | 0.1 | 0.1 | 0.0 | 0.1 | 0.0 | 0.0 | 0.0 |
| T_820 | [%] | 87.2 | 86.8 | 86.0 | 84.9 | 84.8 | 77.2 | 51.8 | 53.7 |
| T_820-920 | [%] | 89.2 | 89.0 | 88.7 | 88.1 | 89.4 | 84.4 | 68.0 | 69.9 |

Table 5 shows that addition of butyl tosylate in combination with Solvent Green 28 allows for a relatively high transmission in the infrared wavelength region even at abusive moulding conditions.

The invention claimed is:

1. A polycarbonate composition comprising an interfacial polycarbonate,
   wherein the composition comprises, based on the weight of the composition;
   greater than 0 to 3 ppm by weight of an acid stabilizer, wherein the acid stabilizer is a sulfonic acid ester,
   0.05 to 0.5 wt. % of Solvent Green 28,
   0.01 to 0.5 wt. % of Solvent Red 135,
   0.01 to 0.5 wt. % of Solvent Red 52,
   optionally 0.01 to 0.5 wt. % of blue colorant,
   optionally an additive selected from the group consisting of release agents, antioxidants, UV stabilizers, flame retardants, fillers, and combinations thereof,
   wherein the composition has a transmission of at least 80% in an infrared light wavelength range of from 820 to 920 nm, wherein transmission is determined on an injection moulded plaque having a thickness of 2 mm prepared by injection moulding the composition under abusive moulding conditions, defined as at a maximum temperature of 320° C. and at a residence time of 10 minutes.

2. The polycarbonate composition of claim 1 wherein the transmission in the visible light wavelength range of from 380-740 nm is at most 50%.

3. The polycarbonate composition of claim 1,
   wherein the polycarbonate composition comprises 0.01 to 0.5 wt. % of the blue colorant based on the weight of the composition.

4. A method for the manufacture of the composition of claim 1 comprising combining the polycarbonate, the acid stabiliser, the Solvent Green 28, the Solvent Red 135, the Solvent Red 52, optionally the blue colorant, and optionally the additive in a melt mixing device followed by melt mixing the composition to a substantially homogeneous composition.

5. The method of claim 4 wherein the acid stabiliser is contained in the polycarbonate prior to combining the polycarbonate with the colorants in the melt mixing device.

6. An injection moulded article comprising the composition of claim 1.

7. The injection moulded article of claim 6 wherein said article is a panel for use in or on vehicles.

8. The injection moulded article of claim 7 wherein the article is an exterior front panel for electrical vehicles.

9. A detection system comprising the injection moulded article of claim 6 and a sensor, wherein said sensor is capable of detecting infrared radiation travelling through said injection moulded article.

10. An electric vehicle comprising the injection moulded article of claim 6.

11. A method for the manufacture of an article comprising injection moulding the polycarbonate composition of claim 1.

* * * * *